3,446,969
PHOTOELECTRIC TRACING CONTROL MECHANISM EMPLOYING AN ELECTRICAL FUNCTION TRANSMITTER
Gerhardt Lange, Frankfurt am Main, Germany, assignor to Messer Griesheim GmbH, Frankfurt am Main, Germany, a corporation of Germany
Filed July 22, 1966, Ser. No. 567,292
Claims priority, application Germany, July 22, 1965, M 66,071
Int. Cl. G05b *11/26;* H01j *39/12*
U.S. Cl. 250—202                     7 Claims

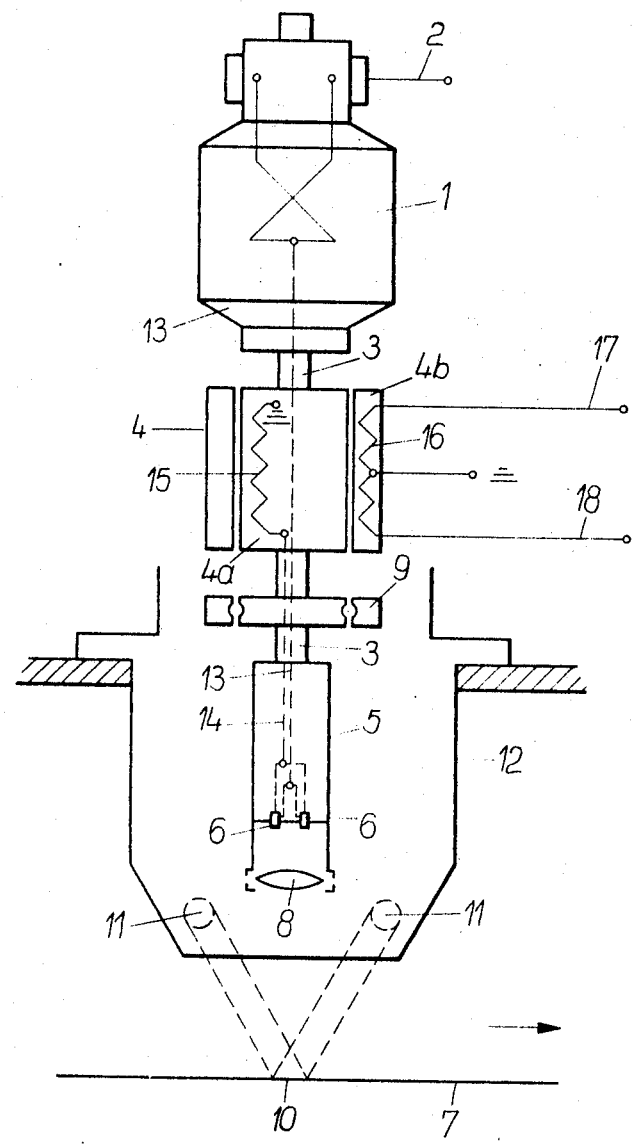

ABSTRACT OF THE DISCLOSURE

A photoelectric tracing control for afterfinishing machines such as separating and plasmic cutting machines utilizes photoelectric resistors as signal changers and utilizes an electric function transmitter for the control of the coordinate drive. The electric function transmitter consists of a rotor with a winding and of a stator with a plurality of windings. The rotor is charged with an alternating current. The photoelectric resistors are mechanically connected to the rotor by a constantly rotating shaft and are electrically connected to the rotor winding. The alternating current is automatically producible for the charging of the rotor winding by the rotating photoelectric resistors.

---

This invention relates to a photoelectric tracing control mechanism for after-finishing machines, particularly torch cutting machines.

With respect to finishing machines, such as torch cutting machines, which operate with a photoelectric control mechanism, it is known to guide the process of the tool (as for example a cutting torch) in such a manner that a dot of light or an arrow of light is allowed to wander over the lines or edges of the drawing matrix whose picture is reflected on a photoelectric resistor. This photoelectric resistor is arranged and planned in such a manner that the voltage fluctuation in the resistor produced by a deviation of the dot of light from the prescribed line, automatically leads to a correction of the movement of the adjusting motor and thus turns the scanner in the certain position to the course of the drawing in question at that time.

When the control operates with a mechanical component scanner (such as a control wheel drive), the parts are rotated at the same speed by means of gears coupled with the scanner. With respect to a coordinating drive in which an electric component scanner is used in place of the wheel drive, a function transmitter is connected with the scanner which also rotates at the same speed as the scanner. In order to bring the scanner into the position corresponding to the direction of movement, an expensive electronic regulation device is necessary. Not only is the device expensive, but also as a result of its dependability on the existing mass forces, it cannot operate without inertia. In addition, undesired vibrations build up which occur because of resonance between the electromotor forces and the mass forces and which even by damping elements cannot be prevented to a tolerable degree.

An object of this invention is to provide a control mechanism which overcomes the above disadvantages.

A further object is to provide such a mechanism which is simple in construction and dependable in performance.

According to the invention the photoelectric tracing control mechanism prevents inherent defects and disadvantages in the know devices of this type in that the scanning device (consisting essentially of a function transmitter as well as a signal transformer) is constantly held in quickly rotating movement during the scanning process. The signal transformer which contains at least one but preferably two photoelectric resistors arranged outside its axis of rotation, is attached together with the rotor of the function transmitter on the elongated shaft of the adjusting motor for the purpose of achieving an exact signal transmission. By such a construction and arrangement of the scanning device, the required alternating current voltage results in the rotor of the function transmitter, by sinusoidal impulses which are produced by the constantly rotating signal transformer during the scanning of the line to be traced. Thus in the function transmitter-stator, an alternating current voltage, depending on the number of rotations of the signal transformer is produced in accordance with the direction of movement of the tracing control mechanism in the corrdinating system.

Novel features and advantages of this invention will become more apparent to those skilled in the art by reference to the following description in conjunction with the accompanying drawing wherein similar reference characters refer to similar parts and in which the single figure shows a schematic view of one embodiment of the invention.

As shown in the drawing, the adjusting motor 1 of the control device, for example a direct current-shunt motor is provided with current by way of conductor 2. Motor 1 is connected with rotor 4a of the function transmitter 4 by means of a hollow shaft 3 as well as with the signal transformer 5 also situated on the elongated motor shaft, wherein the optical signals are transformed into electrical signals. For this purpose the signal transformer contains two photoelectric resistors 6 mounted near the axis of rotation whose light incidence opening points down to the drawing line 7. Above the photoelectric resistors there is an optical system 8 which is displaceable with respect to the signal transformer 5 and is attached thereon in order to enable a possibly necessary cutting seam compensation. For the stability of the entire device, there is provided an intermediate layer or support 9. The illumination of the scanning point 10 of drawing 7 is obtained by means of two incandescent lamps 11 which are accommodated in the stationary housing 12.

The hollow shaft 3 serves for receiving various conductors. To these belong above all the supply conductor 13 for the device with tapping in the signal transfromer 5 for both of the photoelectric resistors 6 as well as the signal line 14 from the photoelectric resistors to rotate 4a of the function transmitter 4. The alternating current voltage of the primary circuit 15 contained therein produces in a known manner in the secondary circuit 16 of stator 4b, an alternating current voltage to which are attached amplifiers (not shown) by means of contacts 17 and 18. The stator 4b of the function transmitter 4 is here adjustably attached in housing 12.

The mode of operation of the device is as follows: The light beams emanating from incandescent lamps 11 produce a spot of light on the scannnig point 10, which is reflected therefrom and is thrown through the optical system 8 on the photoelectric resistors 6. Voltage fluctuations are brought on in the photoelectric resistors by a departing from the drawing line 7 by means of the dot of light. These fluctuations occur when the dot of light is switched over, for example, from the light drawing background to the dark edge of a line or of a silhouette. The fluctuations affect the adjusting motor 1, in a known manner, so that the machine always exactly follows the drawing line. By scanning of a narrow line, and by the axis of rotation of the device being located in about the center of the line, changes in voltage occur in each resistor at the same time at the moment when both photoelectric resistors are above the line. Accordingly only the front photoelectric resistor positioned in the direction of movement effects a utilizable change in voltage, in this case both signals are separated by a so-called "flip-flop" control.

In the novel embodiment of the device, motor 1 drives the signal transformer 5 and rotor 4a of function transmitter 4 at for example 6,000 r.p.m. thus keeping them in constant fast revolving movement. The result is 12,000 signals, which corresponds to a known photoelectric control operating with 200 Hertz units. The signal distance amounts thus to 0.5 mm. at a traveling speed of 6 meters per minute. At the moment when the photoelectric resistors 6—seen from the axis of rotation in the direction of movement—cross over the drawing line, the signals reach the function transmitter 4. By adjusting the function transmitter stator 4b in housing 12 prior to the beginning of motion, any eventual signal delays can be equalized.

Since the signal transformer 5 and rotor 4b of the function transmitter 4 are firmly connected to each other or are situated together on the elongated motor shaft 3, the signals induce, according to the course of the drawing line, to stator 4b of the function transmitter, the required control voltages in the direction of movement. The regulation of the speed of travel is here conducted in the intensifier (connections 17, 18).

By the inventive design and mode of operation of the device, a tracing control mechanism is provided which operates practically inertialess. In connection with a co-ordinating drive, considerably fewer electrical structural elements are required, whereby the device is made considerably simpler; particularly all parts are concentrated in one closed assembly. In this manner, costly loss of time because of interruption is avoided. Inductive static is almost of no importance because of the relatively high supply voltage affected by the armature of the driving motor.

The invention can be realized in the most varied manner and is not limited to the shown model which purely schematically represents the inventive thought.

The characteristic essential in the scope of the invention of the electrically aimed impulse transmission by means of the constantly fast rotating rotor of a function transmitter and a fast rotating signal converter, is furthermore not only usable with respect to photoelectrically controlled coordinating drives, but can be realized with the same advantageous result in cases where the signals are not affected by the photoelectric resistors.

Obviously many modifications and variations of this invention are possible in light of the above description. It is therefore to be understood that within the scope of the appended claims the invention may be practiced otherwise than specifically described.

What is claimed is:

1. In a photoelectric tracing control for after-finishing machines having photoelectric resistors as signal changing means and having an electric function transmitter for control of the coordinate drive, said control having a rotor with a winding and a stator with a plurality of windings, said rotor being charged with an alternating current, the improvement being said photoelectric resistors being mechanically connected with said function transmitter rotor by a constantly rotating shaft, said rotor winding being electrically connected with said photoelectric resistors and the alternating current being automatically producible for charging the rotor winding by means of the rotating photoelectric resistors.

2. A control as set forth in claim 1 wherein there are at least one of said photoelectric resistors, said photoelectric resistors being mounted on said shaft eccentrically to its axis of rotation.

3. A control as set forth in claim 2 wherein said shaft is an extension of the shaft of the drive motor for said control.

4. A control as set forth in claim 2 wherein said shaft is hollow, said rotor being mounted on said shaft, and the electrical leads for said control being housed in said shaft.

5. A control as set forth in claim 4 including a housing for said control, and said function transmitter being adjustably mounted in said housing.

6. A control as set forth in claim 5 wherein said signal changing means includes a signal changer and optics mounted opposite each other in a signal changing housing.

7. A control as set forth in claim 6 including stabilizing means holding said shaft which supports said function transmitter and said signal changing means.

References Cited

UNITED STATES PATENTS

| 2,933,612 | 4/1960 | Chevrenton et al. | 250—202 |
| 2,988,643 | 6/1961 | Inaba | 250—202 |
| 3,124,691 | 3/1964 | Brouwer | 250—202 |
| 3,135,904 | 6/1964 | Purkhiser | 250—202 X |
| 3,286,142 | 11/1966 | Redman | 250—202 X |

JAMES W. LAWRENCE, *Primary Examiner.*

C. R. CAMPBELL, *Assistant Examiner.*

U.S. Cl. X.R.

250—208, 209